United States Patent [19]

Paul et al.

[11] Patent Number: 4,867,468

[45] Date of Patent: Sep. 19, 1989

[54] DECKING TECHNIQUE FOR DELIVERING A PLURALITY OF TRUCKS AND FOR TOWING GENERALLY

[75] Inventors: Jeff Paul, Union City; Michikazu J. Tao, Castro Valley, both of Calif.

[73] Assignee: PACCAR Inc, Bellevue, Wash.

[21] Appl. No.: 244,949

[22] Filed: Sep. 15, 1988

[51] Int. Cl.4 ............................................. B60D 1/04
[52] U.S. Cl. .................................... 280/402; 280/901
[58] Field of Search .................. 280/401, 402, 903; 180/14.1; 296/210

[56] References Cited

U.S. PATENT DOCUMENTS

| | | | |
|---|---|---|---|
| D. 163,279 | 5/1951 | Harris | D14/3 |
| 2,411,411 | 11/1946 | Blair et al. | 280/402 |
| 2,699,223 | 1/1955 | Brumbaugh | 180/89.19 |
| 2,769,501 | 11/1956 | Wagner | 180/68.4 |
| 3,020,064 | 2/1962 | Hinton | 280/402 |
| 3,217,354 | 11/1965 | May | 16/128 |
| 3,792,889 | 2/1974 | Fueher et al. | 293/63 |
| 3,844,369 | 10/1974 | Schroeder et al. | 180/68.6 |
| 3,935,920 | 2/1976 | Schiel | 180/89.14 |
| 4,109,485 | 8/1978 | Grosskopf | 62/298 |
| 4,141,427 | 2/1979 | Kirchweger et al. | 180/89.14 X |

OTHER PUBLICATIONS

Conco International, pp. 28–29, Jun. 1976.

Primary Examiner—Charles A. Marmor
Assistant Examiner—Michael Mar
Attorney, Agent, or Firm—Flehr, Hohbach, Test, Albritton & Herbert

[57] ABSTRACT

A technique especially suitable for delivering trucks from their manufacturing site to a common delivery site. Each of these trucks includes a decking bar mounted to and extending across the truck main chassis in front of and above the axle of its front wheels and a saddle arrangement connected with the chassis adjacent the truck's back end. One of the truck's is selected as the lead, towing truck and the decking bar of a second truck is supported on the saddle arrangement of the lead truck such that the second truck can be towed by the lead truck from the manufacturing site to the delivery site. This technique can also be used to transport an additional truck or trucks between these points and it can be used for towing generally.

15 Claims, 5 Drawing Sheets

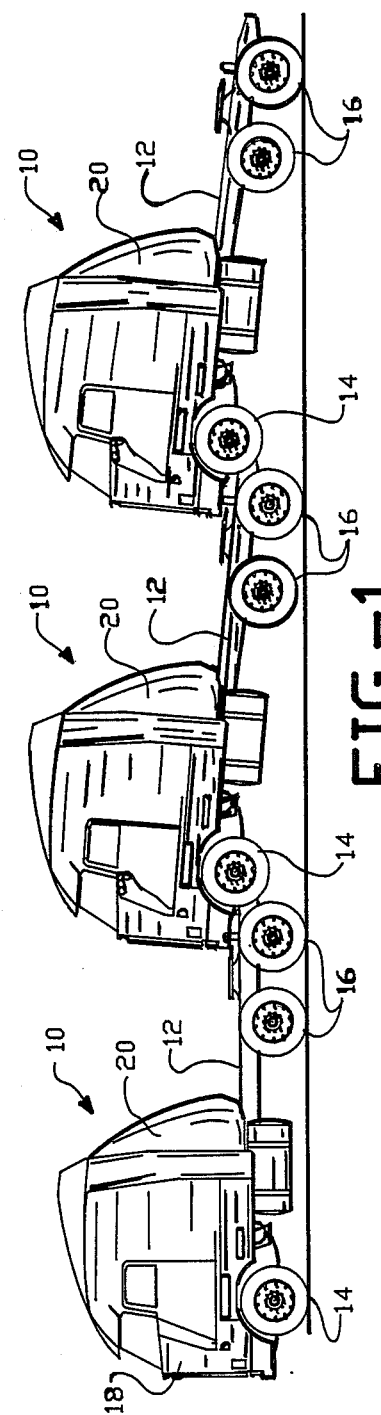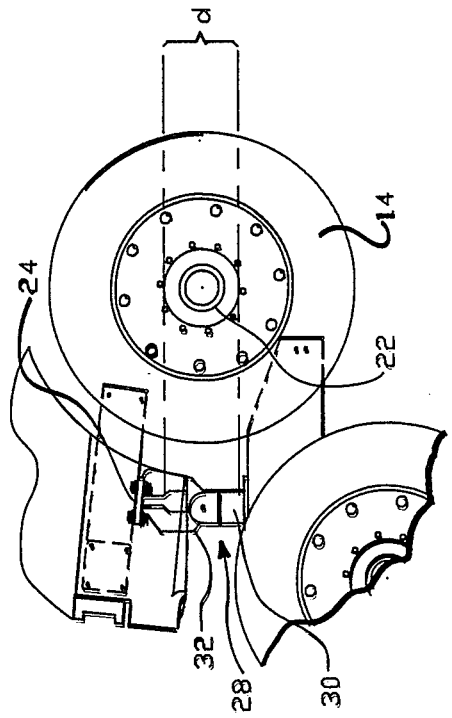

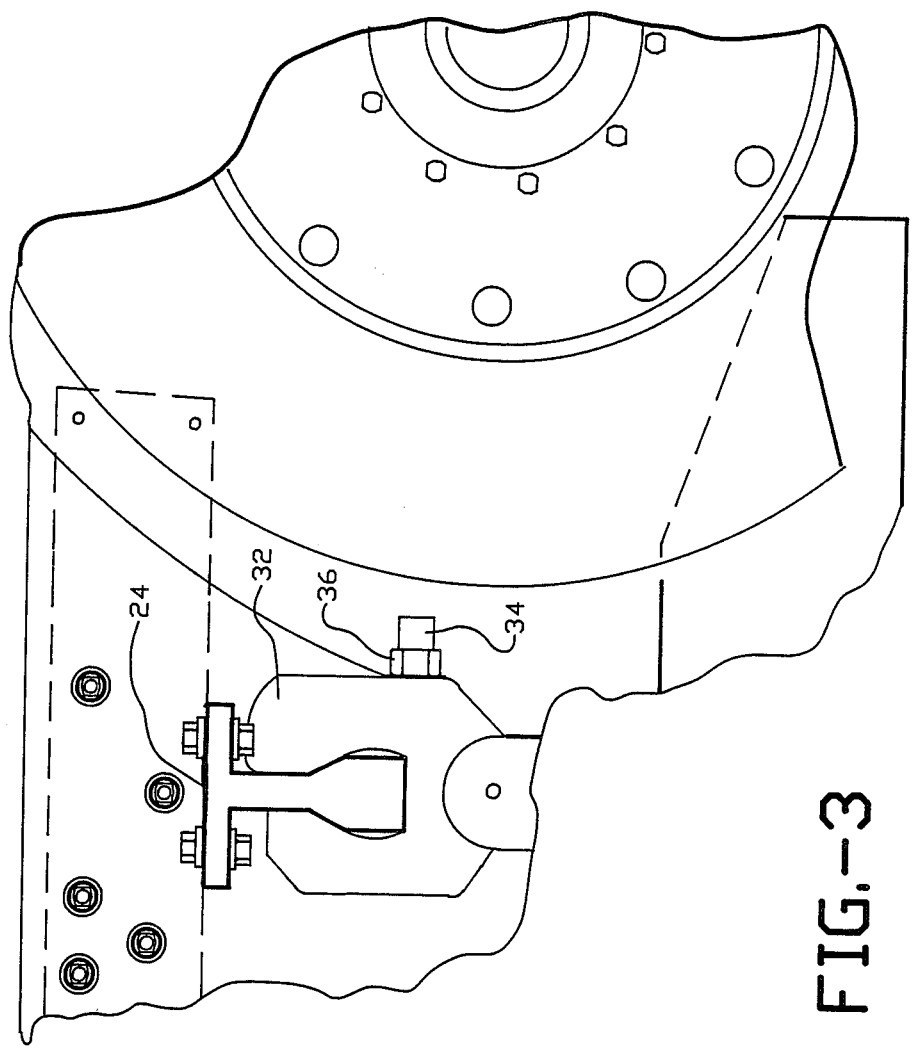

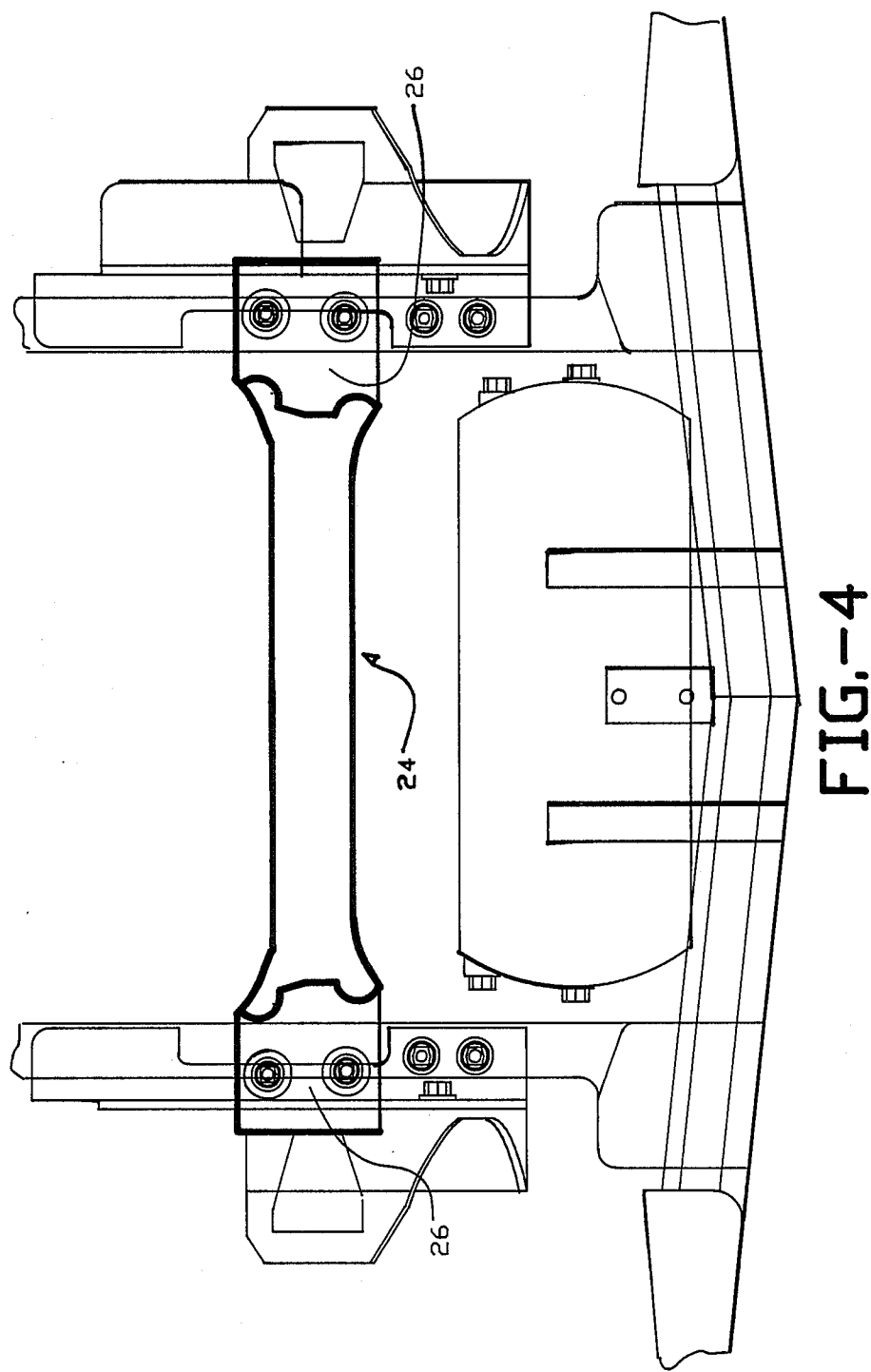

DECKING TECHNIQUE FOR DELIVERING A PLURALITY OF TRUCKS AND FOR TOWING GENERALLY

The present invention relates generally to trucks of, for example, the cab-over-engine type, and more particularly to a technique for delivering trucks from their manufacturing site to a common delivery site in a decked fashion.

One known way to deliver a group of three trucks from a manufacturing site to a common delivery site is to mount the front axle of one of the trucks to be towed on a saddle arrangement supported by the truck doing the towing, while the front axle of the third truck is mounted on a saddle arrangement supported by the first truck being towed. It should be apparent that the very uppermost point of each of the trucks being towed is higher than that point normally is when all four wheels are on the ground. Thus, if it is desirable to transport trucks in this way or to tow them in this way generally, this difference in the height of the truck must be taken into account, especially in states where truck height is limited to a maximum height of, for example 13 feet, 6 inches, as in many states. Thus, under these circumstances, if decking is contemplated during delivery or during towing generally, the maximum height of the truck on all four wheels (e.g., in its driving condition) must be less than would be possible if decking were not contemplated.

The actual difference in height between the typical cab-over-engine type of truck in its normal driving condition (with all four wheels on the ground) compared to the same truck in the decking condition described above, that is, with its front axle mounted on the saddle arrangement of the truck in front of it, is approximately 40 inches. This difference in height has heretofore typically been taken from the cab of the truck in order to make the truck deckable. As will be described in detail hereinafter, the present invention contemplates an improved decking technique in which as much as ten to twelve inches is saved from this difference. That is, the truck which is decked in accordance with the present invention is as much as ten to twelve inches lower at its uppermost point than the same truck that is decked in accordance with the previously known technique described above. As a result, as will be seen, the cab itself can be made ten to twelve inches taller and the truck can still be deckable.

As will be described in detail hereinafter, the truck disclosed herein is one which includes, among other components, a main support chassis mounted on front and back wheel assemblies and a cab and engine supported on the chassis. In accordance with the present invention, a decking bar is mounted to and extends across the chassis transverse to the lengthwise axis of the truck in front of and above the axle of its front wheel assembly. This truck also includes a saddle arrangement connected with the chassis adjacent its back end. Trucks of this type may be delivered from a manufacturing site to a common delivery site, or towed generally, by supporting the decking bar of one of the trucks to be towed on the saddle arrangement of the truck doing the towing. In the case where three trucks are being delivered from the manufacturing site to the common delivery site, the decking bar of the third truck can be supported on the saddle arrangement of the second truck, that is, the other truck being towed.

It should be specifically noted that the decking bar of each of the trucks just described is located in front of and above the axle of its front wheel assembly. Thus, the uppermost point on that truck in its decking position is lower than it would be if the truck were supported on its front axle rather than its decking bar. In an actual working embodiment, the decking bar is as much as ten to twelve inches vertically higher than the front axle.

Because of the savings in height due to the new decking technique described briefly above, the truck disclosed herein has been designed to include a cab whose interior is greater from floor to ceiling than prior cabs by this savings. At the same time, as will also be seen hereinafter, the truck includes a faring which is disengageably mounted to the roof of its cab and which extends lengthwise (from its front end to its back end) a distance approximately equal to the vertical distance from the chassis of the truck to the top of the cab. In this way, the faring can be disengaged from the roof and fastened in a vertically extending position to the back side of the cab immediately above the chassis during delivery of the truck or towing generally. With the faring in this position, it does not add to the overall cab height.

The overall decking technique described briefly above and the trucks involved will be described in more detail hereinafter in conjunction with the drawings wherein:

FIG. 3 is an enlarged diagrammatic illustration of the decking bar and part of the saddle arrangement of FIG. 2, in cross section, along with some surrounding components;

FIG. 4 is a view similar to FIG. 3 but showing the decking bar in plan view;

Figure 5:
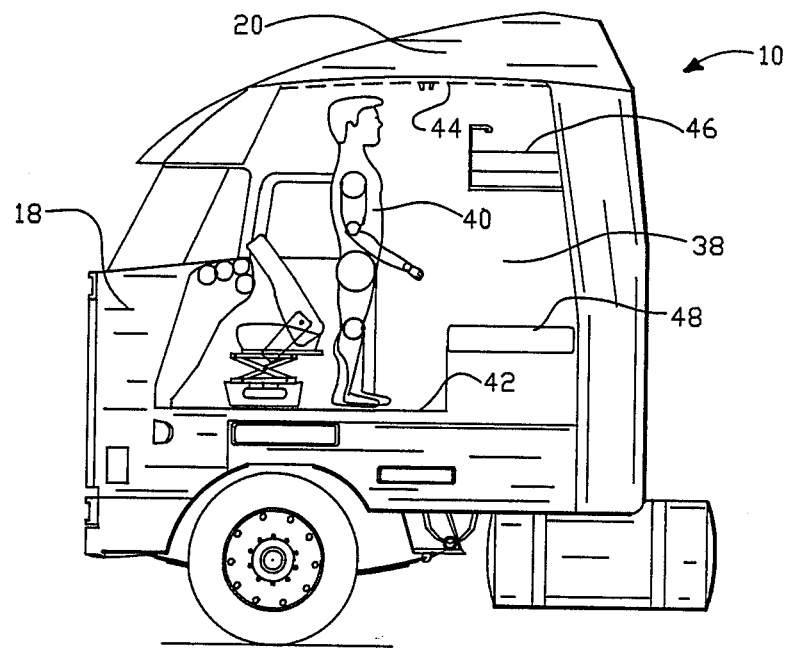
FIGS. 5–8 are diagrammatic illustrations of various truck cab embodiments designed in accordance with the present invention.

Turning now to the drawings, wherein like components are designated by like reference numerals throughout the various figures, three trucks generally indicated by the reference numeral 10 are shown in what may be referred to as a decking condition for delivery from a manufacturing site to a common delivery site. With the exceptions to be discussed hereinafter, each of these trucks is known in the art and will not be described in detail. Moreover, as will be seen, the present invention does not require that the trucks be of any particular type, although the specific trucks shown are of the cab-over-engine type.

Figure 1:
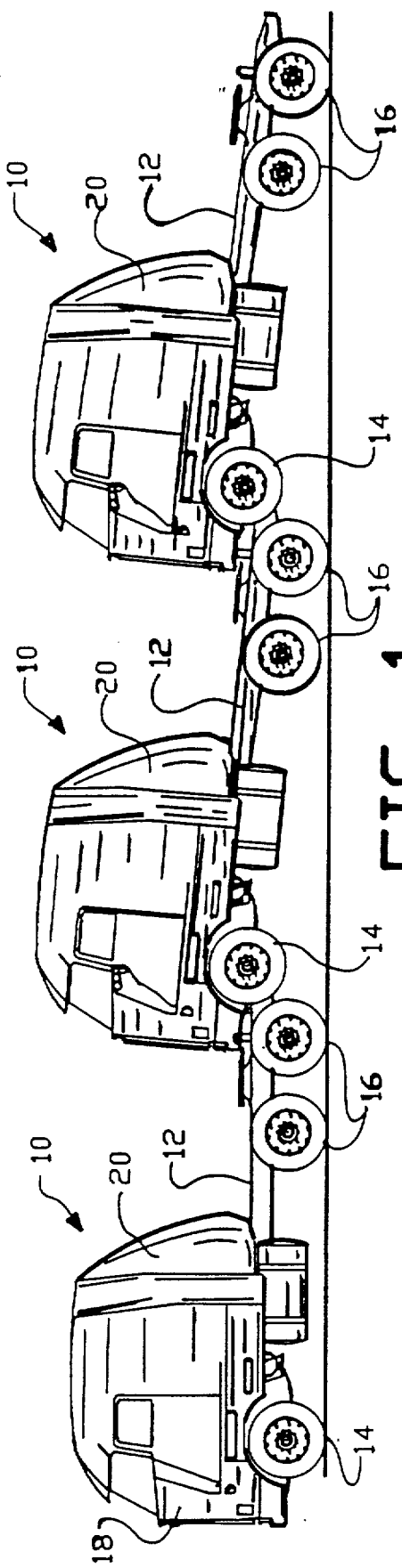
FIG. 1 is a side elevational view of three trucks shown in a decked condition for delivery in accordance with the present invention.

As illustrated in FIG. 1, each truck 10 includes, among other components, a main support chassis 12 mounted on a front wheel assembly 14 and back wheel assemblies 16 and a cab 18 and engine (not shown) supported on the chassis. Each truck also includes a faring 20 which is designed in accordance with the present invention to be disengageably mountable to the roof of its cab while, alternatively, being supportable to the back of the cab during decking, without adding height to the cab.

Figure 2:
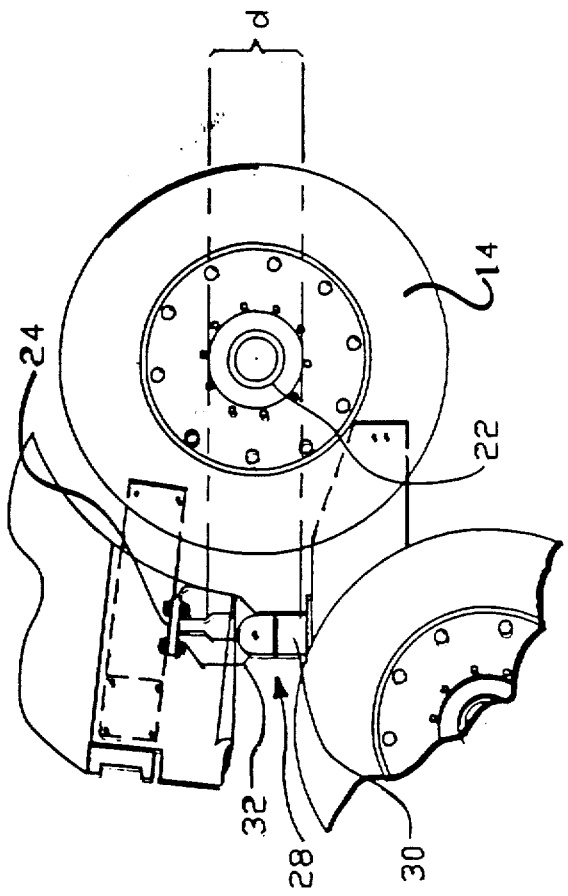
FIG. 2 is an enlarged side elevational view of a portion of one of the trucks shown in FIG. 1, specifically illustrating the decking bar of one truck mounted on a saddle arrangement of another truck in order to provide a decking arrangement in accordance with the present invention.

Turning specifically to FIGS. 2, 3 and 4 in conjunction with FIG. 1, the lower front end section of one of the trucks 10 is shown in detail. More specifically, in FIG. 2, front wheel assembly 12 is shown including a front axle 22. In addition, as seen in FIGS. 2, 3 and 4, each truck is designed in accordance with the present invention to include a rigid decking bar mounted to and extending across chassis 12 parallel to, in front of, and above front axle 22 of wheel assembly 14. As seen best in FIG. 4, the decking bar includes end sections 26 bolted or otherwise suitably fastened to side frames of the chassis 12.

Each truck also includes a saddle arrangement 28 connected with chassis 12 adjacent the back end of the truck. In the particular embodiment illustrated, the chassis arrangement is mounted on top of and extends upward from an upwardly facing surface of chassis 12 immediately above rearwardmost wheel assembly 16. This saddle arrangement includes one and preferably at least two upstanding posts 30 laterally spaced across chassis 12 and each post pivotally supports a pair of jaws 32 which are best illustrated in FIG. 3. These jaws are designed to grip the underside of decking bar 24 and thereby support the latter. The jaws may be locked in their gripping position by any suitable means such as the cooperating bolt 34 and nut 36.

In accordance with the present invention, the middle truck shown in FIG. 1 is decked onto the lead truck (the left hand truck as viewed in FIG. 1) by supporting the middle truck's decking bar 24 on the saddle arrangement 28 of the lead truck, in the manner shown in FIG. 2. The third, right hand truck is decked onto the middle truck in the same manner and the lead truck may be used to tow the other two from the manufacturing site to the common delivery site.

During transport between these two sites, the fairing 20 of each truck is fastened by suitable and readily providable means to the back side of its cab. Note specifically that each fairing extends vertically from a rearmost point adjacent its chassis 12 to a forwardmost point adjacent to but not above the top, back end of its cab. In this way, the fairing does not add any height to the cab in its decked position. Upon delivery of the trucks, their fairings can be mounted to the roofs of their cabs.

It should be apparent from FIG. 1 that the top of the cabs of the trucks being towed are higher than the cab of the towing truck. In an actual working embodiment, the distance from ground to the very top of each of the trucks being towed is 13'-5" maximum which is just below the maximum acceptable height in many states. However, as discussed previously in conjunction with FIG. 2, each decking bar 24 is located immediately in front of and above the front axle 22 of its associated truck. As seen in FIG. 2, the decking bar is above its adjacent front axle by a distance d which,.in an actual working embodiment, is approximately 15.3". Thus, when a truck 10 is in its decking position, its uppermost point is lower than it would be if it were supported on saddle arrangement 28 by front axle 22 by an amount approximately equal to or slightly less than the distance d, or approximately 13.6" in an actual working embodiment. As will be seen below, this savings of 13.6" is utilized in the truck cab itself. That is, the truck cab 18 is designed to include a greater interior height, that is from floor to ceiling, at the front of cab by approximately 13.6". Additional space is gained at the rear of cab due to the slope created in the working embodiment, shown as distance e in FIG. 1. In this regard, note that the interior of the cab is sloped upward from the front to the rear a total amount approximately equal to the distance e, thus grounding even more height in the back of the truck cab. In an actual working embodiment, the distance e is about 6 inches.

Referring specifically to FIG. 5, the interior 38 of truck cab 18 is shown. Note specifically that the trucker, generally indicated at 40 is able to stand on floor 42 within cab interior 38 without his head touching the ceiling 44. In an actual working embodiment, the distance from floor 42 to ceiling 44 is slightly more than 6 feet, 2 inches. The individual shown standing is 6'2". Note also that there is room within interior 38 to include an upper bunk bed 46 extending across the cab interior behind the driver and passenger seats and above the bed 48 supported on the floor of the cab. Upper bunk 46 is of the foldable type. Further, because of the additional distance e gained at the rear of the truck during decking, the ceiling within the truck cab can be sloped upward as shown in FIGS. 5–8, thereby providing extra head room in the back of the cab. In an actual working embodiment, the ceiling at the back of the cab is higher than the ceiling at its front by about 4 inches.

Figure 6:
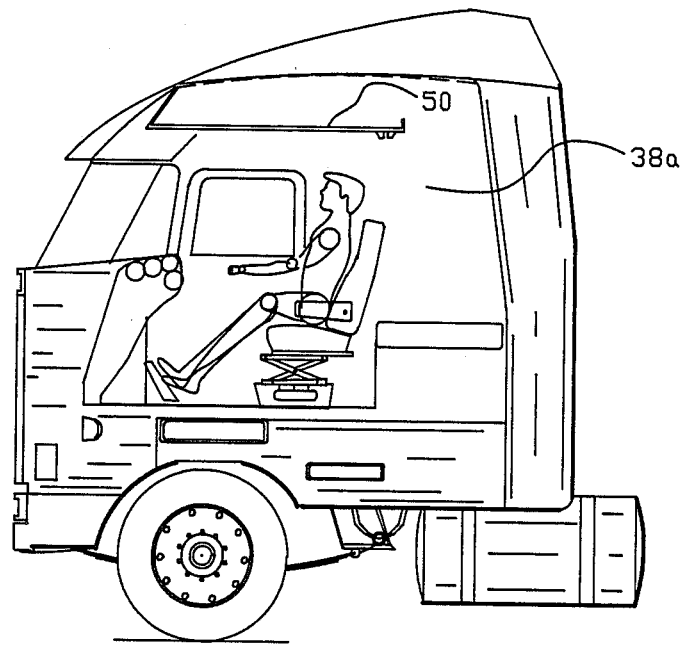
Figure 7:
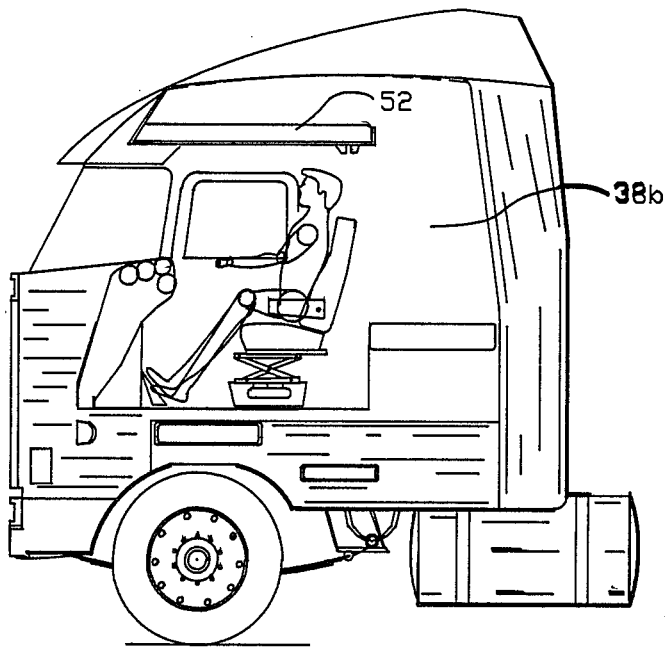
Figure 8:
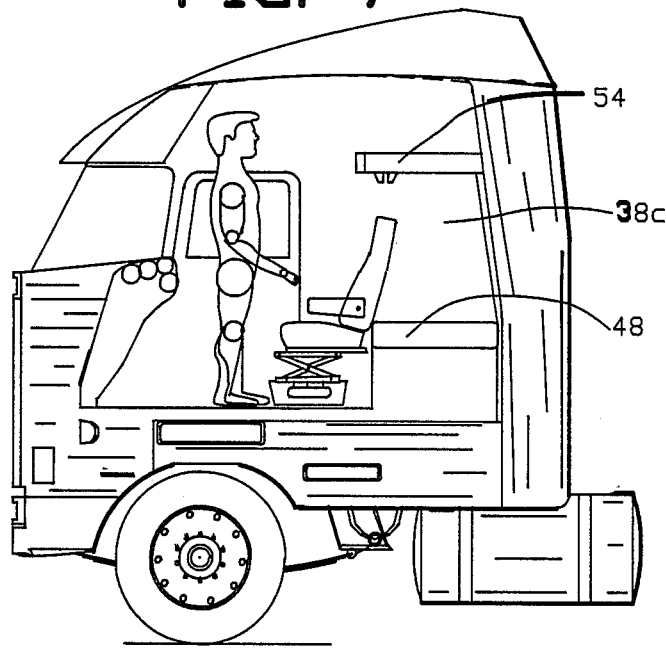

In FIGS. 6, 7 and 8 modified cab interiors 38A, 38B and 38C, respectively, are illustrated. Each of these cab interiors includes the same floor to ceiling height as interior 38. In the case of interior 38A, rather than providing standing room for the trucker, the space above him is utilized for storage, as indicated at 50. As indicated in FIG. 7, the upper space is utilized to support an upper bunk 52 directly above the driver and passenger seats. Finally, interior 38C, like interior 38, provides standing room for the trucker and a nonfoldable bunk 54 immediately above bed 48.

FIGS. 5–8, as described immediately above, present only a few of many different possible interior designs for cab 18 of truck 10. However, all of these designs have in common that their floor to ceiling dimension has been increased by approximately 13.6" over many of those trucks in the prior art which, like truck 10, rely on decking during delivery or towing. As stated previously, because of the present decking technique which uses the previously described decking bar rather than the truck's front axle, approximately 13.6" (in an actual working embodiment) is saved and incorporated into the cab. At the same time, the truck includes a roof fairing during normal driving conditions (as opposed to decking conditions). Thus, in accordance with the present invention, truck 10 not only provides increased height within its cab interior and a roof fairing but is also deckable during transport between its manufacturing and delivery sites or during towing generally.

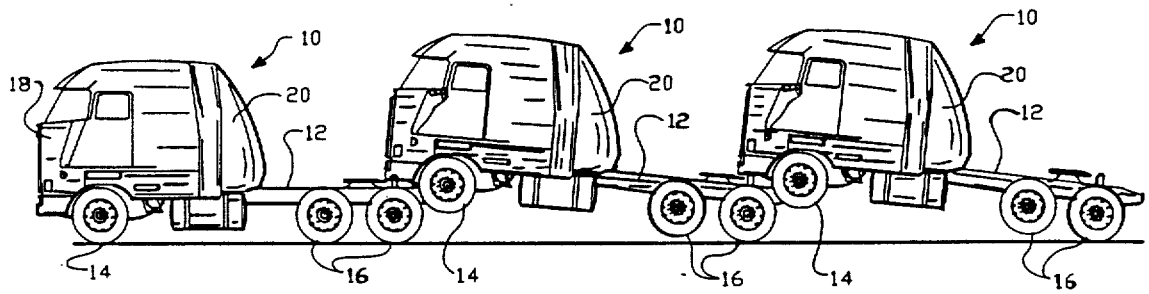

What is claimed is:

1. In a truck including a main support chassis mounted on front and back wheel assemblies, the front wheel assembly including a front axle, and a cab and engine supported on the chassis, the improvement comprising:

(a) a decking bar mounted beneath the front end of said chassis and depending therefrom, said bar extending across said chassis transverse to the lengthwise axis of the truck at a location in front of and above said front axle; and (b) a saddle arrangement connected with and extending upwardly from a top surface of said chassis adjacent the back end of the truck, said saddle arrangement including at least one jaw adapted to engage and lock the decking bar of a second, similarly equipped truck within said at least one jaw for supporting the front end of the second truck in a raised, decking position during delivery of both trucks from their manufacturing site to a common delivery site.

2. The improvement according to claim 1 including a fairing disengageably mounted to the roof of said cab and means for fastening the fairing in a vertically extending, decking position to the back side of said cab immediately above the chassis during delivery of the truck, the length of said fairing being such that it extends from the chassis at one end thereof to the top of said roof at its other end.

3. The improvement according to claim 1 wherein the height of said truck from the ground to the top of said cab is approximately 13'-5".

4. The improvement according to claim 1 wherein the interior of said cab is sufficiently large vertically so as to allow a trucker 6'2" tall to stand within the cab without bumping his head.

5. The improvement according to claim 1 wherein said decking bar is spaced approximately 13.6 inches above said front wheel assembly axle.

6. The improvement according to claim 1 wherein the vertical distance between the floor of said cab and the cab ceiling is at least approximately 6 feet.

7. The improvement according to claim 6 wherein said cab ceiling slopes upward from the front of the cab to the back thereof.

8. The improvement according to claim 6 including a storage shelf within the cab over the driver and passenger seats.

9. The improvement according to claim 6 including a bunk bed within the cab over the driver and passenger seats.

10. The improvement according to claim 6 including a lower bed supported on the floor within the cab behind the driver and passenger seats and a bunk bed mounted over the lower bed.

11. The improvement according to claim 10 wherein said bunk bed is foldable.

12. A method of delivering a plurality of trucks from a manufacturing site to a common delivery site, each truck having a main chassis mounted on front and back wheel assemblies, the front wheel assembly including a front axle, said method comprising the steps of:
 (a) providing each truck to be delivered with
  (i) a decking bar mounted to and extending across the truck's main chassis transverse to the lengthwise axis of the truck at a location in front of and above said front axle, and
  (ii) a saddle arrangement connected with said chassis adjacent the back end of the truck;
 (b) selecting one of said trucks as the lead, towing truck;
 (c) supporting the decking bar of a second one of said trucks on the saddle arrangement of said lead truck such that the second truck can be towed by the lead truck; and
 (d) using said lead truck to tow said second truck from said manufacturing site to said delivery site whereby to deliver both of said trucks to this latter site.

13. A method according to claim 12 including the steps of:
 (a) supporting the decking bar of a third one of said trucks on the saddle arrangement of said second truck such that both said second and third truck can be towed by said lead truck; and
 (b) using said lead truck to tow said second and third trucks from said manufacturing site to said delivery site, whereby to deliver all three trucks to this latter site.

14. A method according to claim 12 wherein each of said trucks includes a fairing which is disengageably mounted to the roof of its cab and which extends lengthwise a distance approximately equal to the vertical distance from the chassis of the truck to the top if its cab, said method including the step of fastening the fairing in a vertically extending decking position to the back side of its cab immediately above the chassis during delivery of the truck.

15. A method of towing one truck with another truck, each trunk having a main chassis mounted on front and back wheel asemblies, the front wheel assembly including a front axle, said method comprising the steps of:
 (a) providing each truck to be towed with
  (i) a decking bar mounted to and extending across the truck's main chassis transverse to the lengthwise axis of the truck at a location in front of and above said front axle, and
  (ii) a saddle arrangement connected with said chassis adjacent the back end of the truck;
 (b) selecting one of said trucks as the lead towing truck; and
 (c) supporting the decking bar of a second one of said trucks on the saddle arrangement of said lead truck such that the second truck can be towed by the lead truck.

* * * * *

UNITED STATES PATENT AND TRADEMARK OFFICE
CERTIFICATE OF CORRECTION

PATENT NO. : 4,867,468

DATED : September 19, 1989

INVENTOR(S) : Paul et al.

It is certified that error appears in the above-identified patent and that said Letters Patent is hereby corrected as shown below:

The title page showing the illustrative figure should be deleted to appear as per attached title page.

The sheet of drawings consisting of Figs. 1 and 2 should be deleted to be replaced with the sheet of drawings as shown on the attached sheet.

Signed and Sealed this

Twenty-first Day of August, 1990

Attest:

HARRY F. MANBECK, JR.

*Attesting Officer*  *Commissioner of Patents and Trademarks*

United States Patent [19]

Paul et al.

[11] Patent Number: 4,867,468
[45] Date of Patent: Sep. 19, 1989

[54] DECKING TECHNIQUE FOR DELIVERING A PLURALITY OF TRUCKS AND FOR TOWING GENERALLY

[75] Inventors: Jeff Paul, Union City; Michikazu J. Tao, Castro Valley, both of Calif.

[73] Assignee: PACCAR Inc, Bellevue, Wash.

[21] Appl. No.: 244,949

[22] Filed: Sep. 15, 1988

[51] Int. Cl.⁴ ............................................. B60D 1/04
[52] U.S. Cl. ..................................... 280/402; 280/901
[58] Field of Search ................ 280/401, 402, 903; 180/14.1; 296/210

[56] References Cited

U.S. PATENT DOCUMENTS

| | | | |
|---|---|---|---|
| D. 163,279 | 5/1951 | Harris | D14/3 |
| 2,411,411 | 11/1946 | Blair et al. | 280/402 |
| 2,699,223 | 1/1955 | Brumbaugh | 180/89.19 |
| 2,769,501 | 11/1956 | Wagner | 180/68.4 |
| 3,020,064 | 2/1962 | Hinton | 280/402 |
| 3,217,354 | 11/1965 | May | 16/128 |
| 3,792,889 | 2/1974 | Fueher et al. | 293/63 |
| 3,844,369 | 10/1974 | Schroeder et al. | 180/68.6 |
| 3,935,920 | 2/1976 | Schiel | 180/89.14 |
| 4,109,485 | 8/1978 | Grosskopf | 62/298 |
| 4,141,427 | 2/1979 | Kirchweger et al. | 180/89.14 X |

OTHER PUBLICATIONS

Conco International, pp. 28–29, Jun. 1976.

Primary Examiner—Charles A. Marmor
Assistant Examiner—Michael Mar
Attorney, Agent, or Firm—Flehr, Hohbach, Test, Albritton & Herbert

[57] ABSTRACT

A technique especially suitable for delivering trucks from their manufacturing site to a common delivery site. Each of these trucks includes a decking bar mounted to and extending across the truck main chassis in front of and above the axle of its front wheels and a saddle arrangement connected with the chassis adjacent the truck's back end. One of the truck's is selected as the lead, towing truck and the decking bar of a second truck is supported on the saddle arrangement of the lead truck such that the second truck can be towed by the lead truck from the manufacturing site to the delivery site. This technique can also be used to transport an additional truck or trucks between these points and it can be used for towing generally.

15 Claims, 5 Drawing Sheets